June 12, 1962 R. L. BLUBAUGH ET AL 3,038,546
HORIZONTAL EARTH BORING APPARATUS
Filed Jan. 15, 1960

INVENTORS.
R. L. BLUBAUGH &
D. L. LINDSAY
BY
Jerry J. Dunlap
ATTORNEY ly mounted in the cutter, double acting hydraulic ram means carried by the support member and connected to said piston for reciprocating the piston in the cutter, and means connecting said ram means to the tractor hydraulic system for actuating said ram means in first one direction and then in an opposite direction when the cutter is removed from a partially completed bore, for forcing dirt out of the open end of the cutter and then retracting said piston from the open end of said cutter prior to a subsequent boring operation.

3,038,546
HORIZONTAL EARTH BORING APPARATUS
Robert L. Blubaugh, 909 W. 31st, Topeka, Kans., and David L. Lindsey, 1040 SW. 44th St., Oklahoma City, Okla.
Filed Jan. 15, 1960, Ser. No. 2,705
5 Claims. (Cl. 175—162)

This invention relates generally to improvements in earth boring apparatus, and more particularly, but not by way of limitation, to an attachment for use with a tractor, preferably of the type commonly known as a bulldozer or Caterpillar, in forming near-horizontal bores through the earth.

As it is well known in the pipeline industry, it is frequently necessary or desirable to extend a pipeline through a substantially horizontally extending bore in the earth, as, for example, when a pipeline crosses a roadway. Many different types of apparatus have been devised for forming such horizontally extending bores, but most of these prior devices are highly complicated and expensive, since they utilize a rotating drill driven by a pneumatic or hydraulic engine. As a result, it is common practice for a pipeline laying crew to merely mount a rather large diameter pipe on a tractor used in the normal pipeline laying operations and repeatedly drive or ram one end of this pipe into the earth underneath a roadway to form a pipeline receiving bore under the roadway. In most operations, the tractor has sufficient power and speed to efficiently drive the pipe into the earth and partially fill the pipe with dirt with each stroke. However, the dirt ordinarily packs rather tightly in the pipe, and one or two men spend an appreciable amount of time in removing dirt from the digging pipe each time the pipe is removed from a partially completed bore. As a result, an unduly large amount of time is required to form such a horizontally extending bore, even under a relatively narrow roadway.

The present invention contemplates the use of a tubular cutter having a hydraulically actuated dirt removing piston mounted therein, such that dirt forced into the cutter in a bore forming operation may be quickly and easily removed when the cutter is removed from a partially completed bore, such that the cutter may be re-run in the partially completed bore in a minimum of time and with the use of a minimum of manpower. In a preferred embodiment, the cutter is mounted on the outer end of an elongated support pipe extending from the cutting blade support assembly of the tractor, for convenience in attaching the cutter to the tractor. When a support pipe is used, a hydraulic ram may be easily mounted in the support pipe and connected to the tractor hydraulic system by hoses extending through the support pipe for reciprocating the piston in the cutter and providing an economical construction. The entire boring attachment has a minimum diameter, whereby substantially the entire boring attachment may be inserted in a partially completed bore.

Broadly stated, the present invention may be defined as the combination of: a tractor having a hydraulic system, and a boring attachment for forming roadway crossing pipeline receiving bores and the like, said attachment comprising an elongated support member having one end thereof connected to the tractor in a position for lengthwise movement of the support member upon forward and rearward movements of the tractor, a tubular cutter mounted on the opposite end of the support member and having one end thereof open, said cutter being mounted on the support member in a position for insertion of the open end thereof into the earth under the roadway upon movement of the tractor in one direction to force dirt into the cutter and form said bore, a piston recip- An important object of this invention is to economically and efficiently form roadway crossing pipeline receiving bores and the like in a minimum of time and with a minimum manpower.

Another object of this invention is to remove dirt from a tubular cutter carried by a tractor in a minimum of time, each time the cutter is withdrawn from a partially completed bore.

A further object of this invention is to provide a horizontal earth boring apparatus which requires only a tractor driver and a part-time helper for its operation.

Another object of this invention is to provide a tractor-mounted horizontal earth boring apparatus which may be completely inserted in a bore underneath a roadway or the like without damage to the apparatus by contact thereof with the sides of a partially completed bore.

A still further object of this invention is to provide a tractor-mounted horizontal earth boring apparatus which is simple in construction and may be economically manufactured.

Other objects and advantages of the invention will be evident from the following detailed description, when read in conjunction with the accompanying drawings which illustrate our invention.

Figure 1:
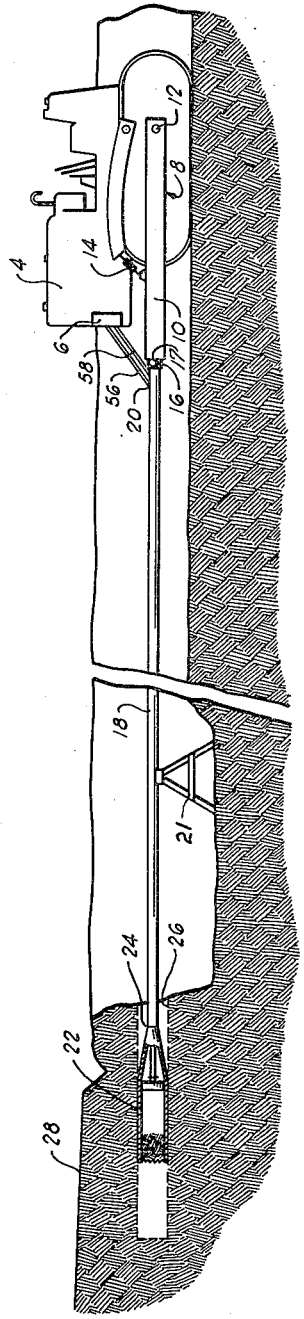
FIGURE 1 is a schematic side elevational view of an earth boring apparatus constructed in accordance with this invention, illustrating the use of the apparatus in forming a substantially horizontal bore underneath a roadway.

Referring to the drawings in detail and particularly FIG. 1, reference character 4 designates a suitable tractor having a hydraulic control system, including a control section 6, preferably mounted on the front of the tractor 4. The tractor 4, as previously indicated is preferably of the type commonly known as bulldozer or Caterpillar which has a cutting blade support assembly 8 generally comprising a support arm 10 pivotally mounted on each side of the tractor 4 by shafts 12. It will be observed that only one pair of the support arms 10 and shafts 12 are shown in the drawings. A hydraulic ram 14 is connected to at least one of the support arms 10 for raising and lowering the usual cutting blade (not shown) mounted on the forward ends 16 of the arms 10.

In accordance with the present invention, an elongated support member 18, preferably in the form of a pipe, is connected at one end 20 thereof to the support arms 10. The support member 18 is preferably secured to the arms 10 by a hinge type clamp 16 characterized by a pivot pin 17 to allow vertical pivoting movement of the support member 18 with respect to the tractor 4. The hinge type clamp 16 is of the general type illustrated in U.S. Patent 2,752,122 to Hyatt et al. A skid 21 slidingly supports a medial portion of the pipe 18 to cooperate with the support arms 10 in controlling the vertical direction of the pipe 18. A tubular cutter 22 is mounted on the outer end 24 of the support member 18 for forming a substantially horizontally extending bore 26 underneath a roadway or the like 28, as will be described in more detail below.

Figure 2:
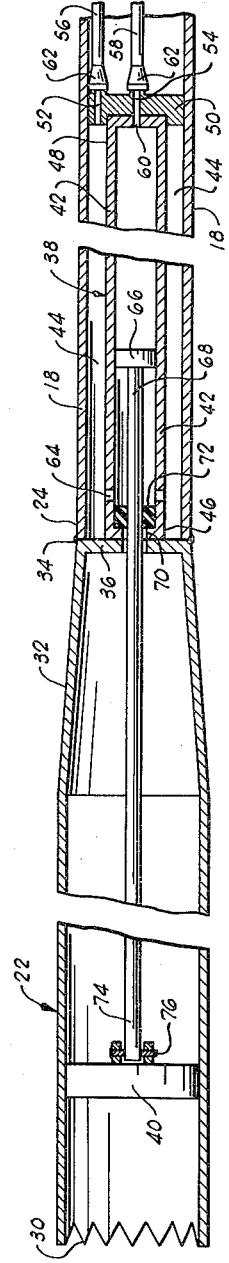
FIGURE 2 is a schematic vertical sectional view through the cutter and hydraulic ram means utilized in the preferred embodiment of this invention.

As shown in detail in FIG. 2, the outer end 30 of the tubular cutter 22 is open and is provided with serrations to facilitate the cutting action of the cutter when the cutter is moved against the end of a partially completed bore. The opposite end portion 32 of the tubular cutter 22 is reduced in diameter to preferably the same size as the support member 18 for connection with the outer end 24 of the support member 18 by welding 34 or the like. It will be apparent to those skilled in the art that the tubular cutter 22 may be easily formed of a section of pipe having a diameter larger than the support pipe 18 and with the end portion 32 thereof swedged downwardly to a diameter corresponding to the diameter of the support pipe 18, and with a plate 36 rigidly secured in the end portion 32 of the pipe.

A double-acting hydraulic ram 38 is mounted in the outer end portion of the support pipe 18 for actuating a piston 40 reciprocally disposed in the tubular cutter 22. The hydraulic ram 38 comprises a cylinder 42 having an outer diameter slightly less than the inner diameter of the support pipe 18 to provide an annular passageway 44 between the cylinder 42 and the pipe 18. The outer end 46 of the cylinder 42 is suitably secured to the end plate 36 of the tubular cutter 22. The inner end 48 of the cylinder 42 in supported in a medial portion of the pipe 18 by a suitable plate 50 to retain the cylinder 42 concentrically in the pipe 18.

A pair of bores 52 and 54 are formed through the support plate 50 to provide communication between a pair of hoses 56 and 58 and the annular passageway 44 and the inner end 48 of the cylinder 42, respectively. It will be apparent that the bore 52 is formed through the outer edge portion of the support plate 50 in communication with the annular passageway 44, and that the bore 54 is formed through the central portion of the support plate 50 in mating relation with a port 60 formed in the inner end 48 of the cylinder 42. The hoses 56 and 58 are secured to the support plate 50 in any suitable manner, such as by connectors 62 fitting around mating projections or couplings formed on the support plate 50 around the bores 52 and 54. The hoses 56 and 58 extend through the support pipe 18 to a point adjacent the tractor 4 and are then extended into connection with the control section 6 of the tractor hydraulic system, such that hydraulic fluid may be directed through either of the hoses 56 or 58 in either direction. Since the ram 38 is double-acting, fluid flowing through the hose 56 will pass through the passageway 44 and then through one or more ports 64 in the outer end 46 of the cylinder 42 while fluid is being exhausted through the port 60 and through the other hose 58. It will also be understood that this flow of fluid through the hoses 56 and 58 may be reversed for an opposite action of the ram 38.

A suitable plunger 66 is reciprocally disposed in the cylinder 42 and has a plunger rod 68 rigidly connected to one end thereof. The plunger rod 68 extends through aligned openings 70 in the outer end 46 of the cylinder 42 and in the end plate 36 of the tubular cutter 22 into connection with the piston 40 in the tubular cutter. It will be understood that a suitable packing gland 72 is provided in the outer end 46 of the cylinder 42 to prevent the leakage of fluid from the cylinder around the plunger rod 68. It should also be noted that the outer end 74 of the plunger rod 68 is connected to the piston 40 by means of a pin 76 to provide a rather loose pivotal connection of the piston 40 to the plunger rod. This connection of the piston 40 to the plunger rod 68 is provided to accommodate any slight misalignment of the tubular cutter 22 with the cylinder 42, and to accommodate any slight variations in the inner surface of the tubular cutter 22. However, the tubular cutter 22 is preferably secured in axial alignment with the cylinder 42 and the support pipe 18, such that the support pipe 18 may easily follow the tubular cutter 22 when the cutter is forming a bore, as will be described. It should further be noted that the piston 40 fits loosely in the tubular cutter 22, such that a minimum machine work on the piston 40 and on the inner surface of the tubular cutter 22, if any, will be required.

*Operation*

In forming the bore 26 underneath the roadway 28, the hydraulic controls on the tractor 4 are first operated to direct fluid through the hoses 56 and 58 in a direction to move the plunger 66 of the ram 38 toward the tractor 4 and retract the piston 40 away from the open end 30 of the tubular cutter 22. The tractor support arms 10 and skid 21 are then properly positioned to extend the support pipe 18 at the desired direction from the tractor 4. It will be understood that the direction of the support pipe 18 will be in alignment with the proposed direction of the bore 26.

The tractor 4 is then moved forwardly to drive or ram the open end 30 of the cutter into the earth underneath the roadway 28 with a force and at a sufficient speed to at least partially fill the tubular cutter 22 with dirt. The tractor 4 is then moved rearwardly to withdraw the tubular cutter 22 from underneath the roadway 28 and expose the open end 30 of the cutter. The controls of the hydraulic system on the tractor 4 are then operated to direct high pressure fluid through the hose 58 into the outer end of the cylinder 42 and return fluid from the cylinder 42 through the hose 56. This hydraulic fluid forces the ram plunger 66 outwardly toward the end 46 of the ram 38 and moves the piston 40 through the tubular cutter 22 toward the open end 30 of the cutter. As a result, the piston 40 forces dirt out the open end 30 of the tubular cutter. It will be understood that the ram 38 will be of a length to provide a stroke of the piston 40 throughout the length of the tubular cutter 22. Also, it should be noted that the support pipe 18 and the cutter 22 may remain extended at the desired digging or boring angle from the tractor 4 as dirt is being discharged out the open end of the cutter 22 to minimize the loss of time in discharging dirt from the cutter and preparing the apparatus for a subsequent boring operation.

When all of the dirt has been removed from the cutter 22, the flow through the hoses 56 and 58 is again reversed to retract the ram plunger 66 toward the end 48 of the cylinder 42 and to retract the piston 40 from the open end 30 of the tubular cutter. The tractor 4 is then again driven forwardly to force the cutter 22 lengthwise through the partially completed bore 26 and force another quantity of dirt into the open end 30 of the cutter for an extension of the bore 26. The cutter 22 is then again withdraw from the partially completed bore 26 and the ram 38 is actuated first in one direction and then in an opposite direction to discharge dirt out of the open end 30 of the cutter and prepare the apparatus for a subsequent digging or boring operation. It will be understood that these steps are repeated until the bore 26 extends all the way underneath the roadway 28, such that a pipeline or the like may be extended through the bore 26 and will not interfere with traffic along the roadway 28.

The serrations in the open end 30 of the cutter 22 greatly facilitate the cutting action of the cutter and will normally provide a larger load of dirt in the cutter with each stroke of the apparatus. It should also be noted that since the ram 38 and the hoses 56 and 58 are enclosed in the support pipe 18, and since the support pipe 18 is of a smaller diameter than the tubular cutter 22, the support pipe 18 will easily follow the cutter 22 through the bore 26. Thus a bore 26 having a length substantially equal to the overall length of the cutter 22 and support pipe 18 may be formed with the present apparatus.

From the foregoing it will be apparent that the present invention provides a novel horizontal earth boring apparatus by which roadway crossing pipeline receiving bores and the like may be formed efficiently and in a minimum of time. The present apparatus requires no energy other than that which is readily available from equipment normally provided at a pipeline laying operation, and the only manpower required for utilizing the present apparatus is a tractor driver and a portion of the time of a helper to manipulate the skid. The tubular cutter is at least partially filled with dirt with each stroke of the apparatus and this dirt is easily and efficiently removed from the cutter each time the cutter is removed from a partially completed bore. Finally, it will be apparent that the present apparatus is simple in construction, may be economically manufactured, and will have a long service life.

Changes may be made in the combination and arrangement of parts or elements as heretofore set forth in the specification and shown in the drawings, it being understood that changes may be made in the precise embodiment disclosed without departing from the spirit and scope of the invention as defined in the following claims.

We claim:

1. In combination with a tractor having a hydraulic system, a boring attachment for forming roadway crossing pipeline receiving bores and the like, comprising an elongated support member having one end thereof connected to the tractor in a position for lengthwise movement of the support member upon forward and rearward movements of the tractor, a tubular cutter mounted on the opposite end of the support member and having one end thereof open, said cutter being mounted on the support member in a position for insertion of the open end thereof into the earth underneath the roadway upon movement of the tractor in one direction to force dirt into the cutter and form said bore, a piston reciprocally mounted in the cutter, double-acting hydraulic ram means carried by the support member and connected to said piston for reciprocating the piston in the cutter, and means connecting said ram means to the tractor hydraulic system for actuating said ram means in first one direction and then in an opposite direction when the cutter is removed from a partially completed bore, for forcing dirt out of the open end of the cutter and then retracting said piston from the open end of said cutter prior to a subsequent boring operation.

2. In the combination with a tractor having a hydraulic system, a boring attachment for forming roadway crossing pipeline receiving bores and the like, comprising an elongated support pipe having one end thereof connected to the tractor in a position for lengthwise movement of the support pipe upon forward and rearward movements of the tractor, a tubular cutter mounted on the opposite end of the support pipe in axial alignment with the support pipe, said cutter having the end thereof remote from the support pipe open for insertion into the earth underneath the roadway and for receiving dirt upon movement of the tractor in one direction, a piston reciprocally mounted in the cutter, double-acting hydraulic ram means mounted in said opposite end of the support pipe and connected to said piston, and means connecting the ram means to the tractor hydraulic system for actuating the ram means in first one direction and then in an opposite direction when the cutter is withdrawn from underneath the roadway, to discharge dirt from the cutter and then retract said piston from the open end of the cutter prior to a subsequent boring operation.

3. The combination defined in claim 2 wherein said ram means comprises a cylinder rigidly supported in the support pipe in axial alignment with the support pipe and tubular cutter with one end of said cylinder being closer to said tractor than the other end, a plunger reciprocally mounted in said cylinder, and a plunger rod connected to said plunger and extending through one end of said cylinder into connection with said piston, and said means connecting the ram means to the tractor hydraulic system includes hoses connected to said one end of said cylinder adjacent the tractor and extending through said support pipe.

4. The combination defined in claim 3 wherein said piston is pivotally connected to said plunger rod for limited sideways movement of said piston caused by variations in the inner periphery of said cutter.

5. In combination with a tractor having a hydraulic system and a power operated support assembly, a boring attachment for forming roadway crossing pipeline receiving bores and the like, comprising an elongated support pipe having one end thereof hinged to said support assembly for vertical pivoting movement of the support pipe, said support pipe being extended forwardly from the tractor, a tubular cutter mounted on the opposite end of the support pipe in axial alignment with the support pipe, said cutter having its end remote from the support pipe open for insertion into the earth under the roadway and for receiving dirt upon forward movement of the tractor, a piston reciprocally mounted in the cutter, double-acting hydraulic ram means mounted in said opposite end of the support pipe and connected to said piston, and means connecting the ram means to the tractor hydraulic system for actuating the ram in first one direction and then in an opposite direction when the cutter is withdrawn from underneath the roadway, to discharge dirt from the cutter and then retract said piston from the open end of the cutter prior to a subsequent boring operation.

References Cited in the file of this patent

UNITED STATES PATENTS

| 1,861,038 | Thornley | May 31, 1932 |
| 2,005,978 | Larson et al. | June 25, 1935 |
| 2,054,254 | Howard | Sept. 15, 1936 |
| 2,325,565 | Williams | July 27, 1943 |
| 2,517,494 | Kiss et al. | Aug. 1, 1950 |
| 2,529,246 | Detrick | Nov. 7, 1950 |
| 2,656,128 | Fladung | Oct. 20, 1953 |
| 2,682,120 | Wirkkala | June 29, 1954 |

FOREIGN PATENTS

| 322,910 | Switzerland | July 15, 1957 |